United States Patent
Park et al.

(10) Patent No.: US 10,601,249 B2
(45) Date of Patent: Mar. 24, 2020

(54) WIRELESS POWER TRANSMITTER AND RECEIVER

(71) Applicant: LG ELECTRONICS INC., Seoul (KR)

(72) Inventors: Yongcheol Park, Seoul (KR); Joonho Park, Seoul (KR); Jihyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 466 days.

(21) Appl. No.: 15/453,589

(22) Filed: Mar. 8, 2017

(65) Prior Publication Data

US 2017/0264144 A1  Sep. 14, 2017

Related U.S. Application Data

(60) Provisional application No. 62/306,035, filed on Mar. 9, 2016.

(51) Int. Cl.
| | |
|---|---|
| *H02J 50/12* | (2016.01) |
| *H02J 50/40* | (2016.01) |
| *H02J 50/80* | (2016.01) |
| *H02J 7/02* | (2016.01) |
| *H02J 50/60* | (2016.01) |
| *H02J 50/90* | (2016.01) |

(52) U.S. Cl.
CPC .............. *H02J 50/12* (2016.02); *H02J 7/025* (2013.01); *H02J 50/40* (2016.02); *H02J 50/60* (2016.02); *H02J 50/80* (2016.02); *H02J 50/90* (2016.02)

(58) Field of Classification Search
CPC .. H02J 50/12; H02J 50/40; H02J 50/90; H02J 50/60; H02J 7/025; H02J 50/80
See application file for complete search history.

(56) References Cited

U.S. PATENT DOCUMENTS

| | | | | |
|---|---|---|---|---|
| 2013/0307473 A1* | 11/2013 | Han | ........................... | H02J 7/04 320/108 |
| 2015/0214752 A1* | 7/2015 | Gluzman | ................ | H01F 38/14 307/104 |
| 2017/0061142 A1* | 3/2017 | Niessen | ................ | G06F 21/604 |

* cited by examiner

*Primary Examiner* — Jared Fureman
*Assistant Examiner* — Michael J Warmflash
(74) *Attorney, Agent, or Firm* — Birch, Stewart, Kolasch & Birch, LLP

(57) ABSTRACT

Disclosed is a method for wirelessly transmitting, by a power transmitter including a primary coil, power. The method may include detecting the placement of objects on a surface of an interface included in the power transmitter and selecting a power receiver which belongs to the detected objects and to which power is to be transmitted, performing digital ping for applying a power signal for detecting and identifying the power receiver to the power receiver and receiving a response to the digital ping from the power receiver, obtaining information about the configuration of the power receiver and establishing a power transfer contract with the power receiver using the configuration information, and wirelessly transmitting the power to the power receiver based on the established power transfer contract.

9 Claims, 8 Drawing Sheets

[Fig. 1]
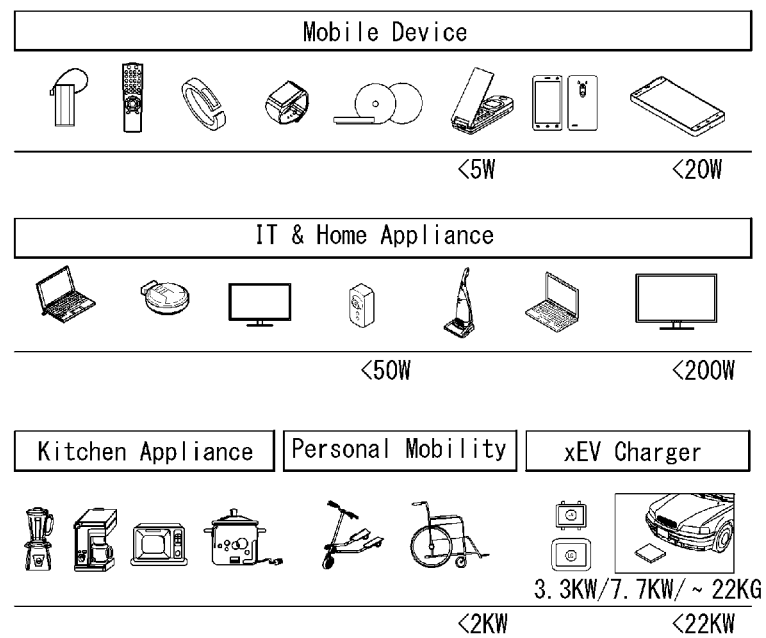

[Fig. 2]
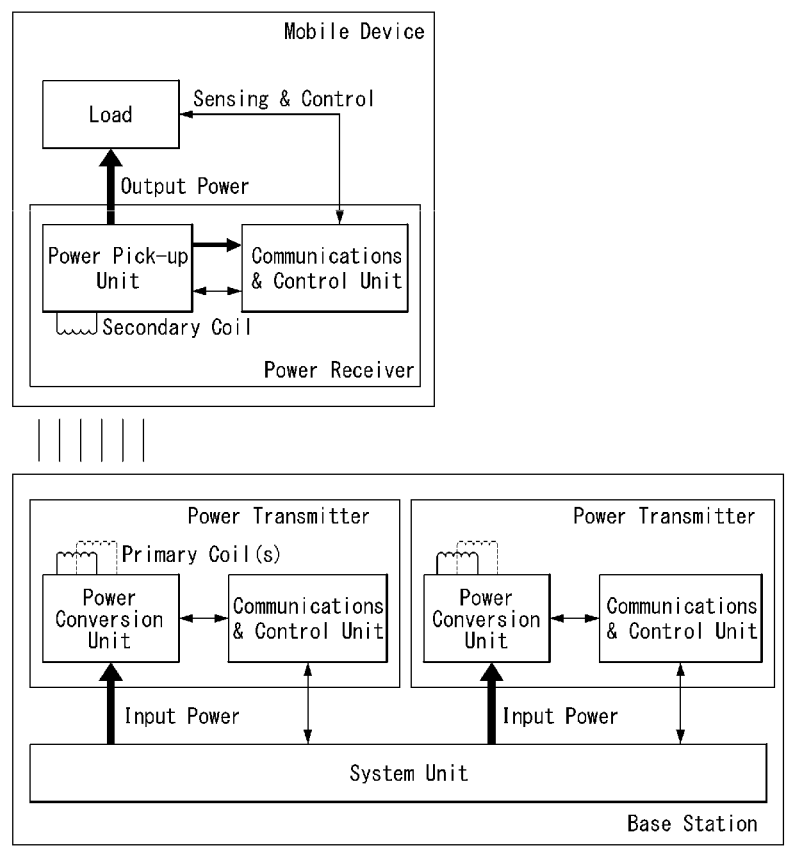

[Fig. 3]
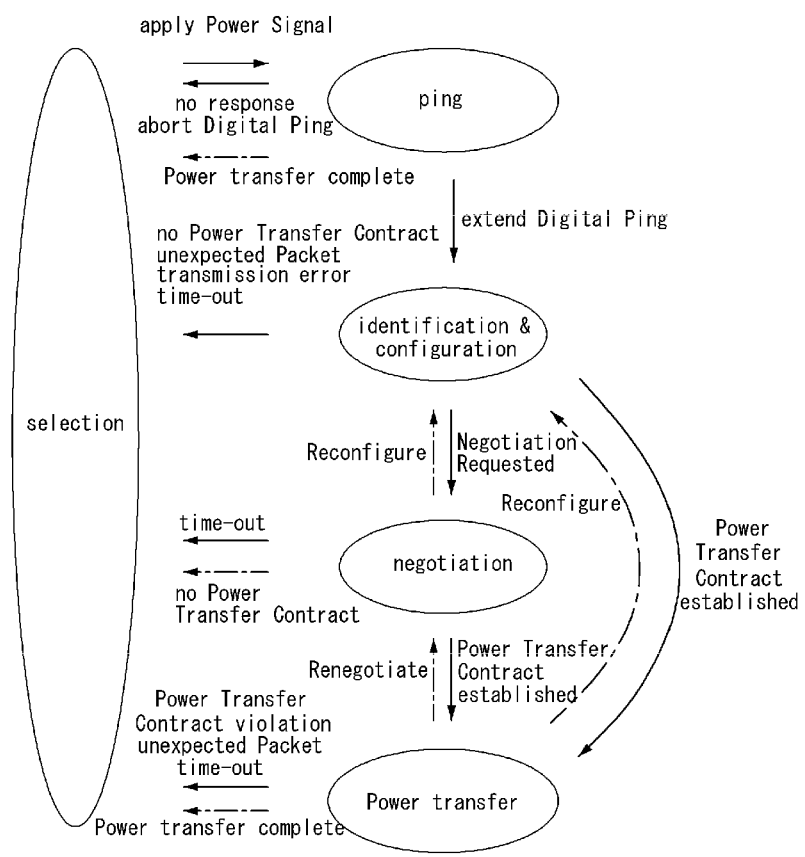

[Fig. 4]
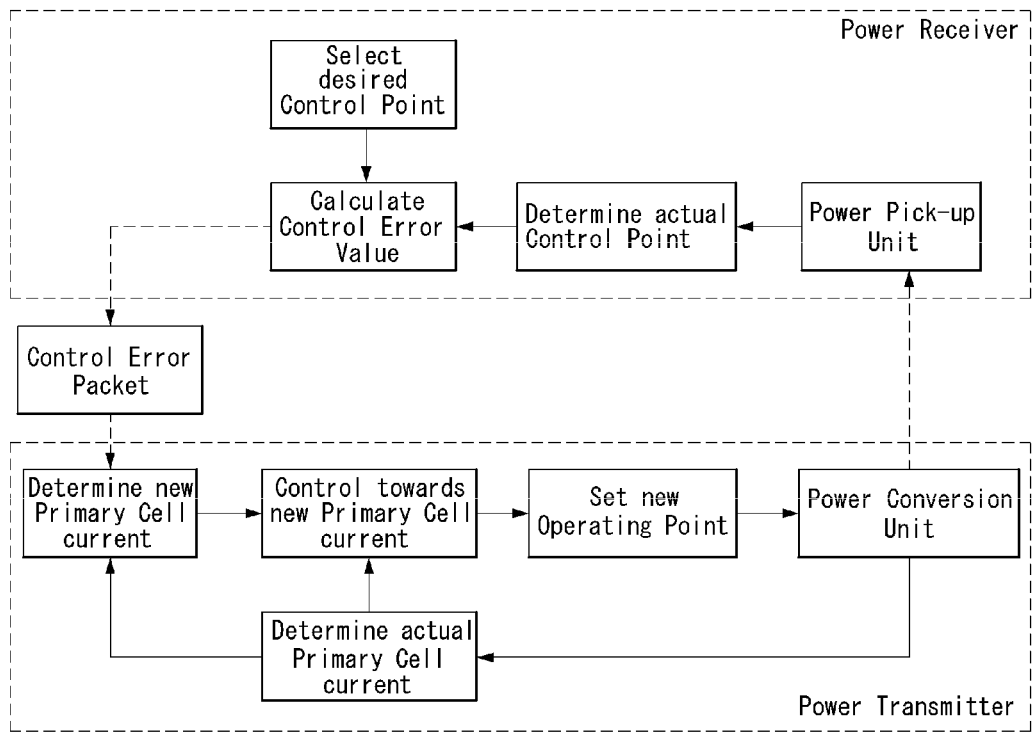
[Fig. 5]
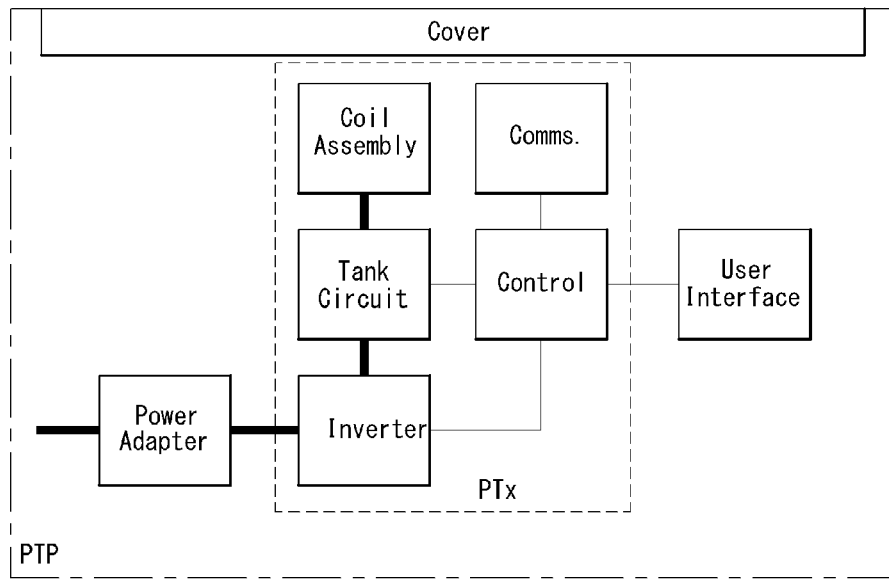

[Fig. 6]
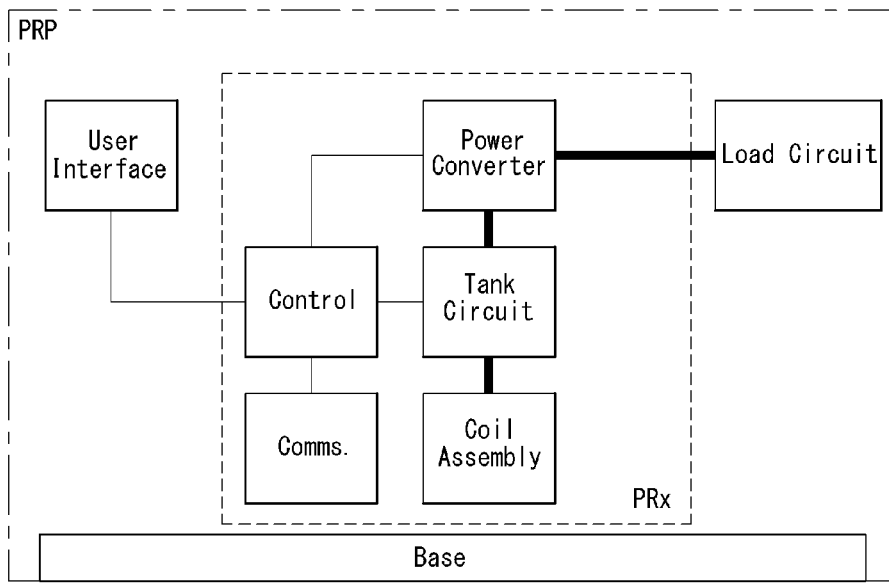
[Fig. 7]
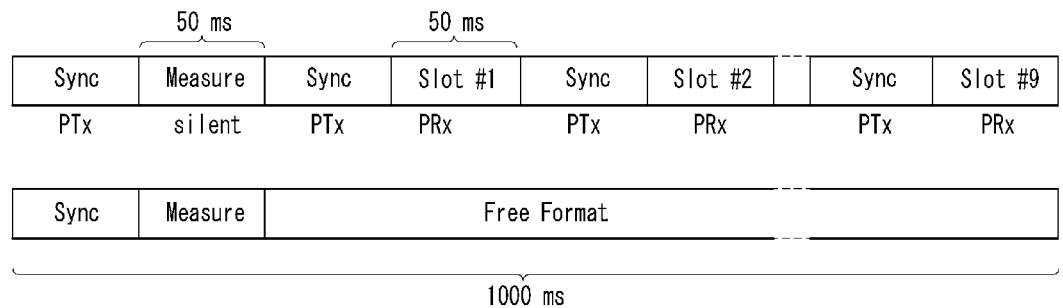
[Fig. 8]
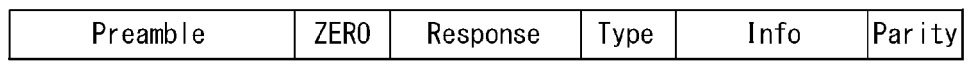
| Response | Type | Info(Type is ZERO) | Info(Type is ONE) |
|---|---|---|---|
| '00':no comms | ZERO:slot sync | '00':allocated | '00':slotted |
| '01':comms error | ONE:frame sync | '01':locked | '01':free format |
| '10':NAK | | '10':free | '10':reserved |
| '11':ACK | Parity :odd | '11':reserved | '11':reserved |

[Fig. 9]
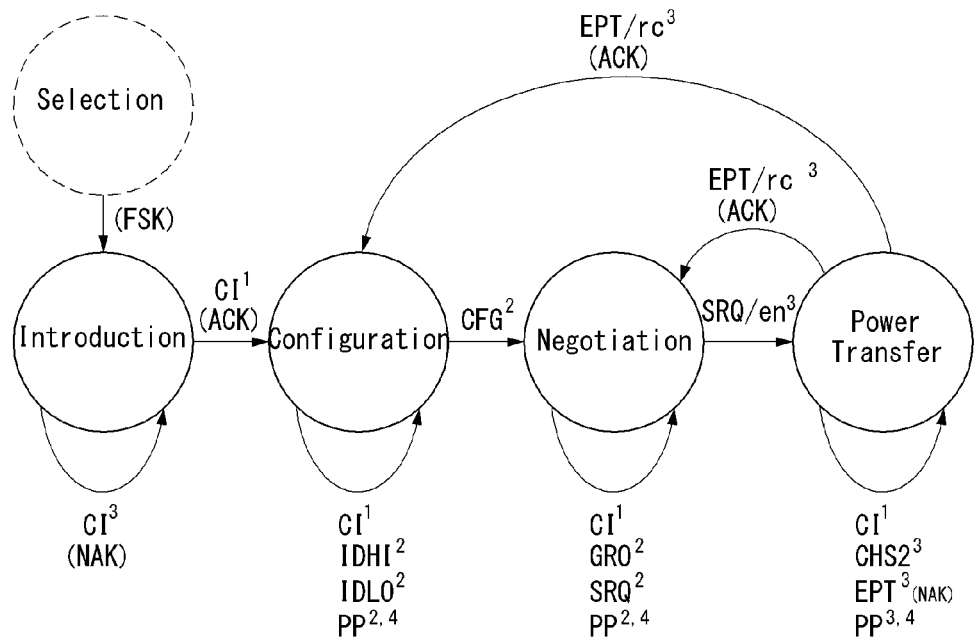
[Fig. 10]
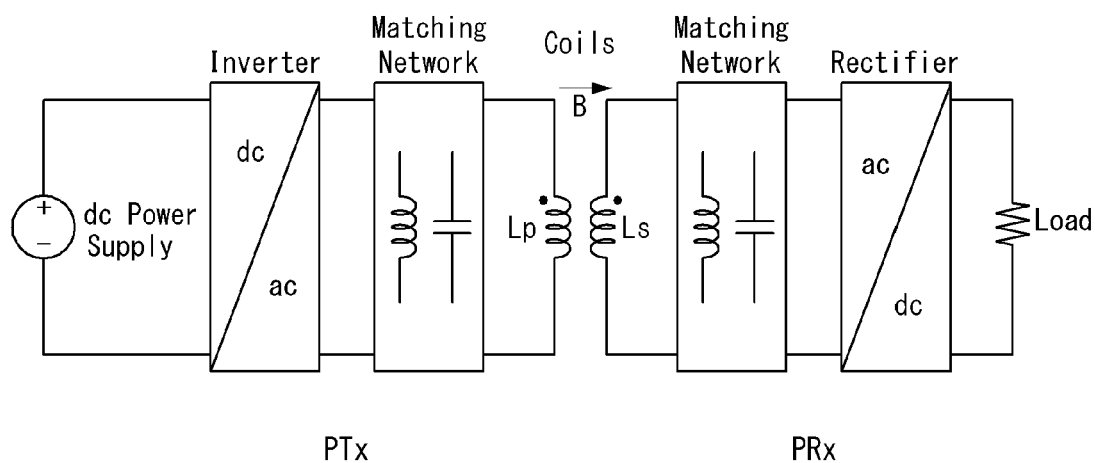

[Fig. 11]
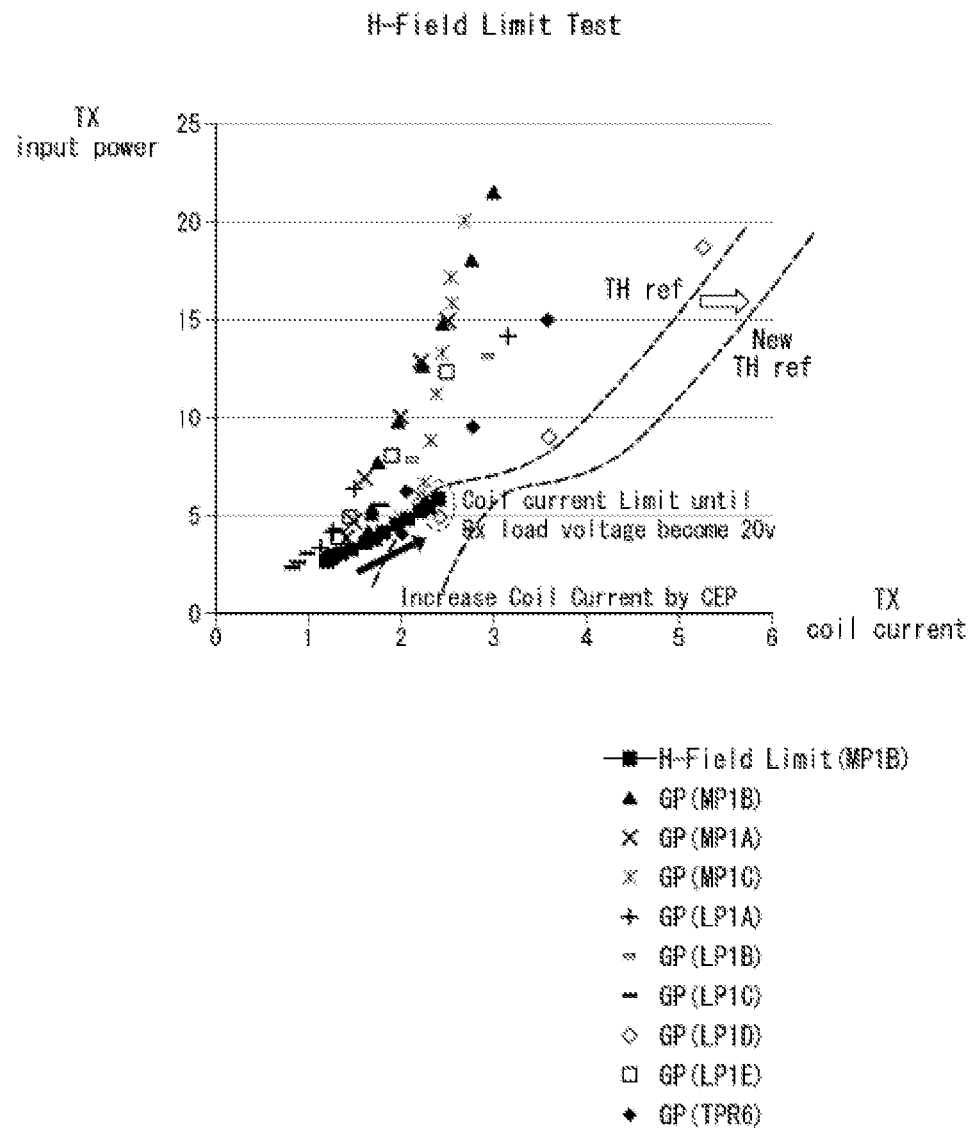

[Fig. 12]
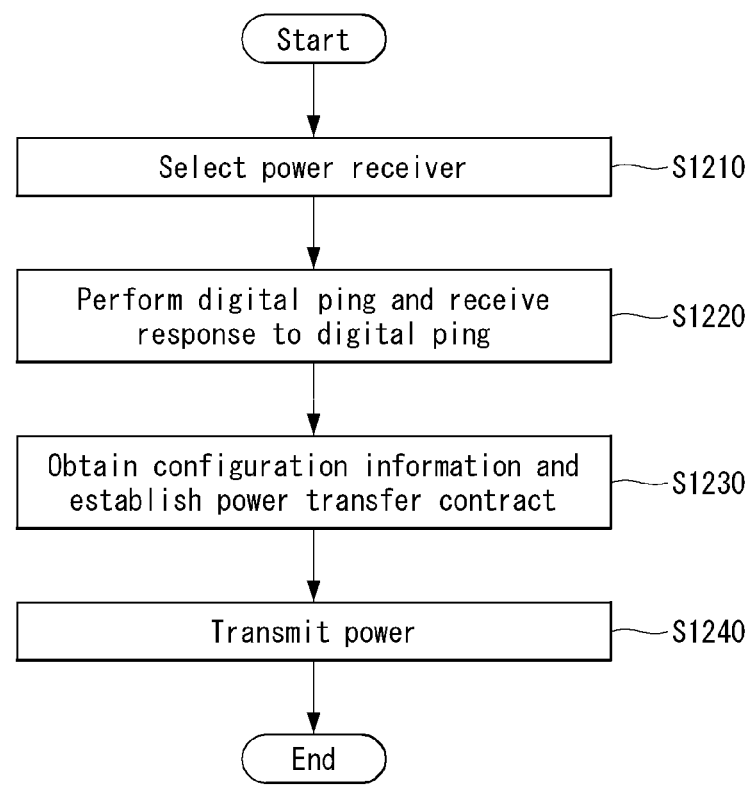

WIRELESS POWER TRANSMITTER AND RECEIVER

CROSS-REFERENCE TO RELATED APPLICATION

This application claims the benefit of U.S. Provisional Application No. 62/306,035 filed on Mar. 9, 2016. The contents of this Provisional Application are hereby incorporated by reference in its entirety.

BACKGROUND OF THE INVENTION

Field of the Invention

The present invention relates to a wireless power transmitter and receiver and a method of controlling the same.

Discussion of the Related Arts

A contactless wireless charging method is an energy transfer method for electromagnetically transferring energy without using a wire in a method for sending energy through an existing wire so that the energy is used as power for an electronic device. The contactless wireless transmission method includes an electromagnetic induction method and a resonant method. In the electromagnetic induction method, a power transmission unit generates a magnetic field through a power transmission coil (i.e., a primary coil), and a power reception coil (i.e., a secondary coil) is placed at the location where an electric current may be induced so that power is transferred. In the resonant method, energy is transmitted using a resonant phenomenon between the transmission coil and the reception coil. In this case, a system is configured so that the primary coil and the secondary coil have the same resonant frequency, and resonant mode energy coupling between the transmission and reception coils is used.

SUMMARY OF THE INVENTION

An embodiment of the present invention provides a method and apparatus for properly adjusting the coil current threshold of a power transmitter based on each specification of a power receiver so that the power receiver is not damaged by a strong magnetic field due to the explosion of the power receiver to the strong magnetic field and transmitting the adjusted input or output voltage threshold.

In accordance with an embodiment of the present invention, a method for wirelessly transmitting, by a power transmitter including a primary coil, power, may include detecting the placement of objects on a surface of an interface included in the power transmitter and selecting a power receiver which belongs to the detected objects and to which power is to be transmitted, performing digital ping for applying a power signal for detecting and identifying the power receiver to the power receiver and receiving a response to the digital ping from the power receiver, obtaining information about the configuration of the power receiver and establishing a power transfer contract with the power receiver using the configuration information, and wirelessly transmitting the power to the power receiver based on the established power transfer contract.

Furthermore, the method for wirelessly transmitting power may further include receiving threshold adjustment support information used to adjust the reference threshold of a current of the primary coil from the power receiver prior to the transmission of the power.

Furthermore, the reference threshold may be set based on a reference power receiver having a maximum-receivable rectified voltage level set as a predetermined level.

Furthermore, the predetermined level may be 20 V.

Furthermore, transmitting the power may include adjusting the reference threshold based on the received threshold adjustment support information and determining a power level to be transmitted to the power receiver based on the established power transfer contract and the adjusted reference threshold and transmitting the power having the determined power level to the power receiver.

Furthermore, the threshold adjustment support information may be indicative of an inductance value of the power receiver and/or the maximum rectified voltage level capable of being received by the power receiver.

Furthermore, adjusting the reference threshold may include adjusting the reference threshold in inverse proportion to the inductance value and in proportion to the maximum rectified voltage level.

Furthermore, the reference threshold may be adjusted based on the following equation.

$$I_{th\_new} = I_{th\_ref} \times \frac{V_{rec\_limit\_new}}{V_{rec\_limit\_ref}} \times \sqrt{\frac{L_{ref}}{L_{new}}}$$

In this case, the $I_{th\_new}$ may be a reference threshold after the adjustment, the $I_{th\_ref}$ may be a reference threshold prior to the adjustment, the $V_{rec\_limit\_new}$ may be the maximum rectified voltage level of the power receiver, the $V_{rec\_limit\_ref}$ may be the maximum rectified voltage level of the reference power receiver, the $L_{ref}$ may be an inductance value of the reference power receiver, and the $L_{new}$ may be the inductance value of the power receiver.

Furthermore, if the threshold adjustment support information is indicative of a first range including the inductance value and a second range including the maximum rectified voltage level, adjusting the reference threshold may include adjusting the reference threshold in inverse proportion to a minimum value of the first range and in proportion to a maximum value of the second range.

Furthermore, if the threshold adjustment support information is indicative of a first range including the inductance value and a second range including the maximum rectified voltage level, adjusting the reference threshold may include adjusting the reference threshold in inverse proportion to a maximum value of the first range and in proportion to a minimum value of the second range.

Furthermore, the configuration information may include information about a maximum power level capable of being received by the power receiver.

Furthermore, the power transfer contract information may include limit information about a plurality of parameters which characterizes the transfer of the power to the power receiver.

Furthermore, in accordance with another embodiment of the present invention, a method for wirelessly receiving, by a power receiver including a secondary coil, power, may include performing digital ping in which a power signal for detecting and identifying the power receiver may be received from a power transmitter and transmitting a response to the digital ping to the power transmitter, transmitting information about the configuration of the power receiver to the power transmitter and establishing a power transfer contract with the power transmitter based on the configuration information, and wirelessly receiving power from the power transmitter based on the established power transfer contract.

Furthermore, the method for wirelessly receiving power may further include transmitting threshold adjustment support information used to adjust the reference threshold of a current of a primary coil included in the power transmitter to the power transmitter prior to the reception of the power.

Furthermore, a power transmitter according to another embodiment of the present invention includes at least one primary coil configured to generate a magnetic field and a communication & control unit configured to control communication with a power receiver and the transfer of power to the power receiver. The communication & control unit may be configured to detect the placement of objects on a surface of an interface provided in the power transmitter and select a power receiver which belongs to the detected objects and to which power may be to be transmitted, perform digital ping for applying a power signal for detecting and identifying the power receiver to the power receiver and receive a response to the digital ping from the power receiver, obtain information about the configuration of the power receiver and establish a power transfer contract with the power receiver using the configuration information, and wirelessly transmit the power to the power receiver based on the established power transfer contract.

Furthermore, the communication & control unit may receive threshold adjustment support information used to adjust the reference threshold of a current of the primary coil from the power receiver prior to the transmission of the power.

BRIEF DESCRIPTION OF THE DRAWINGS

FIG. 1 illustrates embodiments of various electronic devices to which the wireless charging is applied.

FIG. 2 illustrates a wireless power transmission and reception system according to one embodiment of the present invention.

FIG. 3 is a block diagram illustrating a method for transmitting and receiving power.

FIG. 4 illustrates a method for controlling the transfer of power in an induction mode.

FIG. 5 illustrates a power transmission device according to one embodiment of the present invention.

FIG. 6 illustrates a power reception device according to one embodiment of the present invention.

FIG. 7 illustrates a frame structure for data communication during power transfer.

FIG. 8 illustrates an example of a sync packet.

FIG. 9 illustrates a power transmission method in a shared mode.

FIG. 10 illustrates a simplified model of a wireless power transmission and reception system.

FIG. 11 is a graph showing the results of the measurement of input power and coil current of a power transmitter which are limited in order to satisfy a maximum-receivable rectified voltage with respect to each of different types of a plurality of power receivers.

FIG. 12 is a flowchart illustrating a method for transmitting, by the power transmitter, power according to an embodiment of the present invention.

DETAILED DESCRIPTION OF THE EMBODIMENTS

Terms used in this specification are common terms which are now widely used by taking into consideration functions in this specification, but the terms may be changed depending on an intention of those skilled in the art, a use practice, or the appearance of a new technology. Furthermore, in a specific case, some terms have been randomly selected by the applicant. In this case, the meaning of a corresponding term is described in a corresponding part of a corresponding embodiment. Accordingly, the terms used in this specification should not be understood simply based on their names, but should be understood based on their substantial meanings and contents over this specification.

Furthermore, although embodiments of the present invention are described in detail with reference to the accompanying drawings and contents described in the drawings, the present invention is not limited to or restricted by the embodiments.

Hereinafter, some embodiments of the present invention are described in detail with reference to the accompanying drawings.

For the standardization of wireless power transmitter/receivers, Wireless Power Consortium (WPC) standardizes technologies related to wireless power transmission/reception.

A recently developed wireless charging system may support the transmission/reception of low power of about 5 W. In this case, there is a problem in that a charging time is long and efficiency is low in such a low power charging method because the size of a mobile device and the capacity of a battery are recently increased. Accordingly, a wireless charging system supporting the transmission/reception of middle power of about 15 W~20 W is developed. Furthermore, in order to improve charging efficiency, a wireless charging system to which a resonant method for simultaneously charging a plurality of electronic devices has been added is developed.

An embodiment of the present invention relates to a wireless charging system to which the resonant method has been added and proposes a wireless charging transmitter/receiver using the resonant method, which is compatible with a wireless charging transmitter/receiver using an electromagnetic induction method supporting low power/middle power.

A wireless power transmitter and wireless power receiver of a resonant type proposed by an embodiment of the present invention and a wireless charging method and a communication protocol using the wireless power transmitter and wireless power receiver are described below. Furthermore, hereinafter, resonant mode (or a resonant type) may also be called shared mode (or a shared type). Furthermore, a wireless power transmitter may be abbreviated as a power transmitter or a transmitter, and a wireless power receiver may be abbreviated as a power receiver or a receiver.

FIG. 1 illustrates embodiments of various electronic devices to which the wireless charging is applied. In FIG. 1, the electronic devices are categorized by the level of power transmitted/received in the wireless charging system.

For wearable devices such as smart watches, and small devices including earphones, remote controllers, smart phones, PDAs and tablet PCs, low power (about 5 W or less, or about 20 W or less) wireless charging can be applied. For small or middle size home appliances such as laptop computers, robot cleaners, TV, sound devices, cleaners and monitors, middle power (about 50 W or less, or about 200 W or less) wireless charging can be applied. And for kitchen appliances such as mixers, electronic ranges and electric cookers, and electronic devices/transportation means including personal transportation devices such as wheel chairs, electric kick boards and electric bicycles, and electric vehicles, large power (about 2 kW or less, or 22 kW or less)

wireless charging can be applied. The electronic devices/transportation means illustrated in FIG. 1 can include power receivers described later.

In the following, descriptions will be made mainly with respect to low power and mobile devices, but the descriptions are for embodiments, and the method of wireless power transmission according to the present invention can be applied to various electronic devices described above.

For standardization of wireless power transmission and reception devices, WPC (Wireless Power Consortium) is preparing specifications on the wireless power transmission/reception related technologies.

Currently developing wireless charging systems can support low power transmission and reception up to about 5 W. In recent days, however, as the sizes of mobile devices become larger along with the battery capacity, these methods of low power charging has shown problems of long charging time and low efficiency. Therefore, wireless charging systems supporting up to about 15 W-20 W of mid power transmission and reception are being developed. Wireless charging systems with resonant scheme added to charge multiple electronic devices are also being developed concurrently. The present invention relates to a wireless charging system with resonant scheme added, and aims to propose a resonant type wireless charging transmitter/receiver that is compatible with an inductive type wireless charging transmitter/receiver of low power/mid power.

In the description below, the inductive type and resonant type wireless charging transmitters and wireless charging receivers proposed by the present invention, the method for charging by using the devices, and communication protocols will be explained. Also, the resonant type/mode can be referred to as the shared type/mode in the below. Also, the wireless power transmitter can be referred to as the power transmitter or the transmitter, and the wireless power receiver as the power receiver or receiver in the description below.

FIG. 2 illustrates the wireless power transmission and reception system according to one embodiment of the present invention.

Referring to FIG. 2, the wireless power transmission and reception system includes mobile devices and base stations receiving power wirelessly.

The mobile device includes a power receiver receiving wireless power through a secondary coil, and a load receiving the power from the power receiver and supplying the power to a device. And the power receiver can include a power pick-up unit that receives wireless power signal through the secondary coil and converts the signal into electric energy, and a communication & control unit that controls communication and power signal transmission and reception with the power transmitter. The mobile device can be referred to as the power reception device in the following description.

The base station is a device for providing inductive power or resonant power, and can include one or multiple power transmitters and system units. The power transmitter transmits inductive/resonant power, and can perform power transmission. The power transmitter can include power conversion unit which converts/transmits electric energy to power signal by generating magnetic field through the primary coil(s), and a communication & control unit which controls communication and power transmission to the power receiver so that power can be transmitted at an appropriate level. The system unit can perform other operation controls for the base station such as input power provisioning, control of multiple power transmitters, and user interface control. The base station can be referred to as power transmission device in the following description.

The power transmitter can control the transmitted power by controlling the operating point. The operating point controlled can correspond to the combination of frequency (phase), duty cycle and voltage amplitude. The power transmitter can control the transmitted power by controlling at least one of the frequency (phase), duty cycle/duty ratio and amplitude of the input voltage. The power transmitter can also supply constant power, and control the received power by control of the resonant frequency received by the power receiver.

In the following description, the coil or coil unit can be referred to as the coil assembly, the coil cell or the cell, including the coil and at least one device in the neighborhood of the coil.

Inductive Mode—Low Power and Mid Power

In the description below, the method of power transmission of the power transmitter/receiver operating in inductive mode will be explained first. However, at least one of the methods described in the inductive mode or steps included in the methods can be selectively or optionally used in resonant mode.

FIG. 3 is a block diagram illustrating a method for transmitting and receiving power.

In the wireless charging system according to the present invention, wireless charging can be performed through 5 phases. 5 phases include a selection phase, a ping phase, an identification & configuration phase, a negotiation phase and a power transfer phase, while the negotiation phase can be omitted in the power transmission and reception of the low power mode. In other words, the power transmission and reception is performed in 4 phases in low power mode, negotiation phase can be added in mid power mode for power transmission.

In the selection phase, power transmitter monitors the interface surface for the placement and removal of objects. As in the FIG. 3, the power transmitter may apply a short power signal to detect the presence of foreign object. In other words, the power transmitter may apply a short power signal to the 1st coil (or primary coil) and monitor the presence of foreign object by sensing the current of the 1st coil which is occurred by the power signal. By Definition, when the power transmitter is not applying power signal, the system is in the selection phase.

In the ping phase, the power transmitter executes a digital ping, and listens for a response. If the power transmitter discovers a power receiver, the power transmitter may extend the digital ping, i.e. maintain the power signal at the level of digital ping. This causes the system to proceed to the identification and configuration phase.

In the identification & configuration phase, the power transmitter identifies the selected power receiver, and obtains configuration information such as the maximum amount of power that the power receiver intends to provide as its output. The power transmitter uses this information to create a power transfer contract. This power transfer contract contains limits for several parameters that characterize the power transfer in the power transfer phase.

In the negotiation phase, the power receiver negotiates with the power transmitter to attempt to establish a more advanced power transfer contract. The power receiver sends negotiation requests to the power transmitter, to which the power transmitter responds. The negotiation phase may be proceeded only then the power receiver is the medium power receiver. In the negotiation phase, the following parameters may be negotiated—the guaranteed power level of the power transmitter, the maximum power of the power receiver, etc. When the power receiver is low power receiver, the negotiation phase may be omitted and the system may proceed to the power transfer phase directly from the identification & configuration phase.

In the power transfer phase, the power transmitter provides the power with the power receiver wirelessly. The power transmitter controls the power transfer based on control data about the power being transmitted which is received from the power receiver. The power transmitter monitors the parameters that are contained in the power transfer contract. A violation of any of the stated limits on any of those parameters may cause the power transmitter to abort the power transfer—returning the system to the selection phase.

FIG. 4 illustrates a method for controlling the transfer of power in an induction mode.

As in the FIG. 4, the power transmitter and the power receiver may include a power conversion unit and a power pick-up unit, respectively, as also illustrated in FIG. 2.

FIG. 4 illustrates a method for controlling the transmission of power in an inductive mode.

The power transmitter and the power receiver illustrated in FIG. 4 can include the power conversion unit and the power pick-up unit, respectively, as illustrated in FIG. 1.

Throughout the power transfer phase, the power transmitter and the power receiver control the amount of power that is transferred. The power transmitter and the power receiver operate at a specific control point. Control point indicates the combination of voltage and current provided at the output of the power receiver when the power transfer is performed.

More specifically, the power receiver selects a desired control point—a desired output current and/or voltage, a temperature measured somewhere in the mobile device, etc. In addition, the power receiver determines its actual control point. Using the desired control point and actual control point, the power receiver calculates a control error value and the power receiver transmits the control value as a control error packet to the power transmitter.

The power transmitter may control the power transfer by setting/controlling the new operating point—at least one of amplitude, frequency and duty cycle—by using the received control error packet. Thus the control error packet is transmitted or received by predetermined time interval in the power transfer phase. As an embodiment, the power receiver may transmit the control error value and the value may be set as negative if the power receiver requires less power or positive if the power receiver requires more power. In the inductive mode, the power receiver may control the power transfer by transmitting the control error packet to the power transmitter.

In the resonant mode, the power transfer may be controlled in different ways from the inductive mode. In the resonant mode, one power transmitter should be capable of serving a plurality of power receivers at the same time. But when controlling the power transfer as in the inductive mode, the transferring power is controlled by one receiver so it may be difficult to control the power transfer to other power receivers. Thus in the resonant mode, present invention provides a controlling method that the amount of transferring power is controlled by adjusting resonant frequency of the power receiver itself. But still, the method explained with FIG. 4 may not be totally excluded in the resonant mode and the additional control may be performed by using the aforementioned controlling method.

Shared Mode (Resonant Mode)

FIG. 5 illustrates the power transmission device according to one embodiment of the present invention.

In FIG. 5, the power transmission device can include at least one of a cover which covers the coil assembly, a power adapter which transmits power to the power transmitter, a power transmitter which transmits wireless power, and user interface which provides information on power transmission process or other related information. Especially, the user interface can be included as on option, or can be included as other user interface of the power transmission device.

The power transmitter can include at least one from a coil assembly, a tank circuit (or an impedance matching circuit), an inverter, a communication unit or a control unit.

The coil assembly comprises one or more primary coils to generate the magnetic field and may be referred to as a coil cell.

The tank circuit provides impedance matching between the inverter and primary coils. The tank circuit creates a resonance at a suitable frequency to boost the primary coil current. In the case of a multi-coil power transmitter, the tank circuit typically also contains a multiplexer to route the signal from the inverter to a subset of the Primary coils. The tank circuit may be referred to as an impedance matching circuit.

The inverter converts a dc input to an ac signal. Typically, it uses a full-bridge or half-bridge topology to generate a pulse wave of adjustable frequency and duty cycle. In addition, the inverter may contain a separate stage to adjust the input voltage level.

The communication unit can perform communication with the power receive. The power receiver performs load modulation for request to the power transmitter and communication of information. Therefore, the power transmitter can monitor the current of the primary coil and/or amplitude and/or phase of the voltage to demodulate the data transmitted by the power receiver by using a communication unit. The power transmitter can also control the output power to transmit data by using FSK (Frequency Shift Keying) method through the communication unit. For this purpose, the wireless charging device can further include a current sensor to discover the receiver by detecting the change in the current of the primary coil, and can detect transmission data of the detected receiver.

The control unit can control the communication and of the power transmitter. The control unit can control power transfer by adjusting the above described operating point. The operating point can be determined by, for example, at least one of operation frequency, duty cycle and input voltage.

The communication unit and the control unit can be configured as a separate unit/device/chipset, or can be configured as one unit/device/chipset as shown in FIG. 1.

FIG. 6 illustrates the power reception device according to one embodiment of the present invention.

Referring to FIG. 6, the power reception device can include at least one of the user interface which provides information on the power transmission process and other related information, a power receiver which receives wireless power, and a base supports and covers the load circuit or coil assembly. Especially, the user interface can be included as on option, or can be included as other user interface of the power transmission device.

At least one of the power receiver (or power converter), the tank circuit (or impedance matching circuit), coil assembly, communication unit and control unit can be included.

The power converter can convert the AC power received from the secondary coil into voltage and current which are appropriate for the load circuit. In the embodiment, the power converter can include a rectifier. Additionally, the power converter can adapt the reflected impedance of the power receiver.

The tank circuit provides impedance matching between the secondary coil and the combination of power converter and load circuit. As an embodiment, the tank circuit may generate a resonance near 100 KHz to enhance the power transfer. The tank circuit may be referred to as an impedance matching circuit.

The coil assembly comprises a single Secondary Coil and one or more (ferrite) elements to shield metallic parts of the PRP from the magnetic field.

A PRx uses load modulation to communicate requests and other information to the PTx. For this purpose, the PRx can switch e.g. a resistor or capacitor to change its reflected impedance.

PTx and PRx execute a communications protocol to setup power transfer and assist control thereof. As part of this protocol, the controller determines the difference between the actual and desired operating points of the PRx (e.g., constant output current or voltage subject to a thermal limit). The controller can minimize this difference by adjusting the reflected impedance of the PTx and/or by requesting the PTx to adjust its operating point.

The communication unit and control unit can be configured as a separate device/chipset, or can be configured as one device/chipset as represented in FIG. 1.

In shared mode, the power transmitter should manage information exchange with one or more power receivers. For this purpose, the power transmitter provides a structure for communication with the power receiver, which is the same as the communication frame described below.

Referring to 7, the power transmitter provides a structure which provides a sequence of time slots through which each power receiver can transmit data packets. Sync patterns as shown in FIG. 7 are provided between slots. The sync pattern plays the role of optimizing the communication of the power receiver as well as separating the slots. Especially, the sync pattern can provide information to the receiver for collision resolution and guaranteed latency.

FIG. 7 illustrates a frame structure for data communication during power transfer. The shared mode protocol uses two kinds of frames: slotted frames for transmissions of short data packets from a power receiver to the power transmitter and free-format frames for other purposes—such as transmission of larger data packet in both directions and coil selection in a multi-coil PTx.

All frames start with a sync pattern, which is followed by a measurement slot. The measurement slot may be used for measuring the transmitting power and the receiving power. As an embodiment, one slot frame may comprise 9 slots. A free-format frame has no specific format after the measurement slot. The start bit (information) of the sync packet may indicate the start of the frame.

FIG. 8 illustrates an example of a sync packet.

As in the FIG. 8, the sync packet may include at least one of a preamble, a start bit, a response field, a type field, an info field and a parity bit.

The preamble includes a sequence of bits that are all set to 1. The number of preamble bits depends on the operating frequency. The start bit of the sync may be set to 0. The parity bit, which is the last bit of the sync pattern, is set to 1 if the data field of the sync pattern has an even number of bits set to 1, and is set to 0 otherwise (i.e. an odd parity).

Response field may contain the response of the power transmitter to communications from the power receiver in the preceding slot. The "00" means that the PTx did not detect any communications. The value "01" means that the PTx detected an error in the communications, which most likely was due to a collision between two or more Power Receivers. The values "10" and "11" both mean that the PTx received a data packet correctly, where the PTx denies ("10"—not-acknowledge, NAK) or confirms ("11"—acknowledge, ACK) the request contained therein.

The first sync pattern in a frame, i.e. the one directly before the measurement window, has type field set to 1. All other sync patterns—in a slotted frame—have type field set to 0.

The meaning of the value in Info field depends on the sync pattern type as indicated in the Sync field. In the case that the Type field is set to 1 (frame sync), this field announces the kind of frame, i.e. a slotted frame ("00") or a free-format frame ("01"). In the case that the Type field is set to ZERO (slot sync), this field announces whether the next slot is permanently allocated to a specific PRx ("00"), temporarily locked for use by a specific PRx ("01"), or free for use by any PRx ("10").

FIG. 9 illustrates a power transmission method in a shared mode.

In shared mode, the power transmission method can include selection phase, introduction phase, configuration phase, negotiation phase and power transfer phase.

The selection phase represents the step of selection in the inductive mode as shown in FIG. 3, and selection phase can be omitted in a shared mode and the process is performed in other 4 phases. When the presence of FSK (Frequency Shift Keying) is detected at the power signal before wake-up time out in a shared mode, the process can directly proceed with the introduction phase.

In the introduction phase, the Power Receiver attempts to claim a free slot for sending Control Information (CI) packets in the subsequent configuration, negotiation and power transfer phases of the protocol. Hereto, it selects a free slot and sends an initial CI packet. If the Power Transmitter responds to this CI packet with an ACK, the PRx proceeds to the configuration phase. If the PTx responds with a NAK, another PRx is working through its configuration or negotiation phase. In that case, the PRx retries to claim a free slot. If the PRx has received an ACK in response to its CI packet, it determines the position of its private slot in the frame by counting the remaining slot syncs up to the first frame sync. In all subsequent slotted frames (regardless of its operating phase), the PRx uses this slot to send a CI packet.

If a Power Transmitter has permitted a Power Receiver to proceed to the configuration phase, it provides a series of locked slots for the PRx's exclusive use. This ensures that the PRx can run through the configuration phase without collisions. The PRx uses the locked slots to send the following sequence of data packets: two identification data packets (IDHI and IDLO), optionally one or more proprietary data packets, and a Configuration packet (CFG). After completing this sequence, the PRx proceeds to the negotiation phase.

In the negotiation phase, the Power Transmitter continues to provide locked slots for the Power Receiver's exclusive use. This ensures that the PRx can run through the negotiation phase without collisions. The PRx uses the locked slots to send one or more negotiation data packets optionally intermixed with proprietary data packets, terminating the sequence with a Specific Request (SRQ)/en (end-negotiation packet). After completing this sequence, the PRx proceeds to the power transfer phase and the PTx stops providing locked slots.

At the stage of power transmission, the receiver performs transmission of CI packet by using the allocated slot. Then, power is received. The power receiver can include a regulator circuit. The regulator circuit can be included in the communication/control unit described above. The receiver can self-regulate the reflected impedance of the receiver through the regulator circuit. In other words, the receiver can adjust reflected impedance in order to transmit the power in the amount required by the external load, and to prevent reception of excessive power or overheating. Since the transmitter can refrain from adjusting the power in response to the CI packet received in a shared mode, depending on the operation mode, control can be made to prevent over-voltage state in this case.

Power Receiver Over-Voltage Protection

A Power Transmitter shall limit the amplitude of its Power Signal (or magnetic field strength) such that it does not generate a rectified voltage higher than 20 V at the output of a properly designed Power Receiver.

The Power Signal depends on the amount of current that runs through the Primary Coil. This amount is primarily determined by the Power Transmitter's Operating Point, the Power Receiver's load impedance, and the coupling between the Primary Coil and Secondary Coil. Whereas the Power Receiver can—to a certain extent—control its load impedance and the Power Transmitter's Operating Point by transmitting appropriate Control Error Packets, it has little control over the coupling. As a consequence, scenarios exist in which a higher-than-expected voltage can result at the Power Receiver's output.

In one scenario the user initially places the Power Receiver at a position where the coupling is poor and subsequently moves it to a position where the coupling is strong. In practice this can happen when the user keeps the Power Receiver hovering at a small distance above the Interface Surface before setting it down, or when the user places the Power Receiver with a large misalignment between the Primary Coil and Secondary Coil and subsequently slides it into better alignment.

In either case, the Power Transmitter can detect the Power Receiver and establish communications before the coils are properly aligned. The Power Receiver can then start to control its output voltage to a higher level, such as 12 V, in order to prepare for connecting its load. If the coupling is poor, the Power Receiver typically can reach its target voltage only by driving the power Transmitter to use a high Primary Coil current (and therefore a strong Power Signal or high magnetic field). If the coupling suddenly improves substantially, as in the above scenarios, the Power Receiver does not have time to drive the Power Transmitter back to a lower Primary Coil current. As a result, its output voltage can substantially increase—up to tens of volts if no special precautions are taken.

Many Power Receiver implementations that are based on common IC technology cannot handle such voltages, with 20 V being a safe upper limit. Moreover, design constraints often are of such a nature that commonly used solutions for over-voltage protection cannot be applied. For example, large Zener diodes or dummy loads that can handle the excess power typically are too bulky to fit in space-limited designs.

Accordingly, the Power Receiver typically has no alternative but to rely on the Power Transmitter to keep its voltage below the safe limit.

Whereas a Power Transmitter can hold its Primary Coil current to a sufficiently low level, placing a hard limit on the Primary Coil current can prevent a Power Receiver from reaching its target power level when it has connected its load. A better solution is to define more than one limit according to the amount of power that is transmitted: the Power Transmitter should use a low current limit if the Transmitted Power is low to prevent an over-voltage from occurring in the Power Receiver, and it should use a high current limit if the Transmitted Power is high to enable the Power Receiver to reach its target Operating Point without creating an over-voltage in the Power Receiver. The system model and analysis below explain this approach in more detail.

FIG. 10 illustrates a simplified model of the wireless power transmission and reception system.

Referring to the FIG. 10, the wireless power transmission and reception system comprises a Power Transmitter on the left and a Power Receiver on the right. For clarity, the load circuit is drawn separately from the Power Receiver.

The Power Transmitter consists of a power source (uop, fop), a capacitance Cp, an inductance Lp, and a resistance Rp. The power source supplies a sinusoidal voltage uop at a frequency fop. The Power Receiver consists of a capacitance Cs, an inductance Ls, and a resistance Rs. A load having an impedance ZL is connected to the output terminals of the Power Receiver. The symbols uL, iL, ip, and kop represent the load voltage, load current, Primary Coil current, and coupling factor.

For simplicity the Power Receiver in the model includes neither a rectifier nor a resonance at a frequency fd. The absence of the additional resonance does not significantly affect the results discussed below. The effect of the rectifier is described at the end of this section.

Relations between the parameters are as follows in Equation 1.

$$f_p = \frac{1}{2\pi\sqrt{L_p C_p}}, f_s = \frac{1}{2\pi\sqrt{L_s C_s}}, \qquad (1)$$

$$Q_p = \frac{2\pi f_p L_p}{R_p}, Q_s = \frac{2\pi f_s L_s}{R_s}$$

That is, as described above, in the wireless power transmission/reception system, if the power of the power transmitter is not limited to a specific level, there may be a problem in that the power receiver is exposed to a strong magnetic field. More specifically, if the power receiver is placed in a location where coupling with the power transmitter is poor in a high impedance state, the power receiver may request the power transmitter to raise output power of the power transmitter in order to obtain/receive a required rectified voltage. In the state in which output power at the coil stage of the power transmitter has been raised in response to the request from the power receiver, if the power receiver moves to a location having better coupling by a user (i.e., a coupling step), the power receiver (specifically, the rectifier stage of the power receiver) may be damaged due to the reception of excessive power.

In order to solve such a problem, the threshold of the current or voltage of the power transmitter (particularly, the primary coil of the power transmitter) may be determined/set so that a voltage received/obtained by a specific reference power receiver for test in a high impedance state (e.g., the state in which the impedance value of the power receiver is a predetermined level or more) does not exceed a specific voltage level "Vrec_limit" through a test. In this case, the specific voltage level "Vrec_limit" is a maximum-receivable rectified voltage level (i.e., the threshold of a rectified voltage) at which the power receiver may not be damaged. The power receiver is not damaged unless a rectified voltage of the power receiver that has been received or obtained from the power transmitter exceeds the specific voltage level "Vrec_limit".

For example, it may be assumed that a reference power receiver is a mid-power receiver capable of receiving maximum power of 15 W in a high impedance state and the specific voltage level "Vrec_limit" of the reference power receiver is 20 V. In this case, the reference power receiver may be located at the place having better coupling with the power transmitter (specifically, the primary coil of the power transmitter), and a rectified voltage of the reference power receiver may be monitored by adjusting the current and/or voltage of the primary coil of the power transmitter. As a result of the monitoring, a current and/or voltage of the power transmitter when the rectified voltage is 20 V may be determined to be a threshold. In this specification, an embodiment in which the current threshold of the power transmitter is set is chiefly described.

If the threshold of the current and/or voltage is set as described above, the rectified voltage of the power receiver may not always exceed the specific voltage level "Vrec_limit" regardless of the charging location of the power receiver (or regardless of a coupling coefficient with the power transmitter).

However, there is a disadvantage in that charging performance of a power receiver having different specifications may be reduced because the current and/or voltage threshold of a power transmitter is determined based on only a specific reference power receiver. For example, in the case of a power receiver having a specific voltage level "Vrec_limit" of 25 V, charging performance of the power receiver is reduced because the power receiver receives only maximum power of 20 V due to the set threshold of the power transmitter although the power receiver can receive power of 20 V or higher. This also results in a reduction in the charging area.

In order to solve such a problem, this specification proposes a method for maximizing charging efficiency by properly adjusting an current and/or voltage threshold, set or determined based on a specific reference power receiver, based on the specifications of a power receiver that is being charged.

In this specification, an embodiment in which a coil current of the power transmitter is limited to a specific level is chiefly described, but the present invention is not limited thereto. The present invention may also be applied to an embodiment in which a coil voltage of the power transmitter is limited to a specific level.

In an embodiment, the power transmitter may adjust a previously set or determined current threshold based on the inductance value, specific voltage level "Vrec_limit" and/or coupling coefficient "k" of a power receiver to be newly charged on the basis of a reference power receiver.

The current threshold of the power transmitter may be determined based on the rectified voltage "V_rec" of the power receiver which is defined according to Equation 2 below.

$$V_{rec} = -j\omega k\sqrt{L_1 \cdot L_2} \times i_1 \quad (2)$$

In Equation 2, ω is an operating frequency, k is a coupling coefficient, L_1 is an inductance value at the primary coil of a power transmitter, L_2 is an inductance value at the secondary coil of a power receiver, and i_1 is a current value that flows into the primary coil of the power transmitter.

According to Equation 2, the current threshold of the power transmitter can be determined so that V_rec does not exceed Vrec_limit (e.g., 20V maximum) (i_1 value can be derived when Vrec_limit equals to V_rec). At this time, since the determined i_th (i_1 value when V_rec=Vrec_limit), which is the current threshold of the power transmitter, is proportional to V_rec and inversely proportional to L_2, the newly set current threshold to a different/new power receiver can be determined by Equation 3 as below.

$$I_{th\_new} = I_{th\_ref} \times \frac{V_{rec\_limit\_new}}{V_{rec\_limit\_ref}} \times \sqrt{\frac{L_{ref}}{L_{new}}} \quad (3)$$

In Equation 3, I_th_new is the (coil) current threshold of the power transmitter which is newly set or determined with respect to a new power receiver. I_th_ref is the (coil) current threshold of the power transmitter which has been set or determined based on a reference power receiver. Vrec_limit_new is a voltage level "Vrec_limit" of the new power receiver. Vrec_limit_ref is a voltage level "Vrec_limit" of the reference power receiver, L_ref is the inductance value of the reference power receiver, and L_new is the inductance value of the new power receiver. If the reference power receiver corresponds to the aforementioned mid-power receiver, the voltage level "Vrec_limit" may be 20 V.

That is, referring to Equation 3, the current threshold of the power transmitter may be determined or adjusted based on the inductance value and voltage level "Vrec_limit" of the new power receiver. More specifically, the current threshold of the power transmitter may be adjusted in inverse proportion to the inductance value of the new power receiver and in proportion to the voltage level "Vrec_limit" of the new power receiver.

In order to support the power transmitter so that it can adjust the current threshold, the new power receiver may send threshold adjustment support information, including information about its own inductance value "L_new" and new voltage level "Vrec_limit_new", to the power transmitter.

The threshold adjustment support information, that is, L_new and Vrec_limit_new, may be transmitted and received during a communication phase between the power transmitter and the new power receiver. More specifically, the threshold adjustment support information may be transmitted to the power transmitter in a phase prior to a power transfer phase. For example, the threshold adjustment support information may be transmitted to the power transmitter through a specific packet in a negotiation phase. The present embodiment is described in more detail below with reference to FIG. 12.

In this case, the threshold adjustment support information may be transmitted in a specific bit size (e.g., 1 byte). In some embodiments, the threshold adjustment support information may be transmitted in a form (e.g., Vrec_limit_new=25V) explicitly indicative of a specific value or may be transmitted in a form (e.g., 24V≥Vrec_limit_new≤25V) indicative of a specific level range. If the threshold adjustment support information is transmitted in a form indicative of a specific level range, the power transmitter may select a maximum or minimum value of the level range depending on the characteristic/purpose of the power transmitter and apply the selected maximum or minimum value in adjusting a current threshold.

For example, if the power transmitter wants to stably perform charging rather than charging performance, it may derive a new current threshold of a minimum value of a level range regarding a new voltage level "Vrec_limit_new", received as threshold adjustment support information, by selecting or using a maximum value of a level range regarding a new inductance value "L_new." Alternatively, if the power transmitter wants to improve charging performance rather than stable charging, it may derive a new current threshold of a maximum value of a level range regarding a new voltage level "Vrec_limit_new", received as threshold adjustment information, by selecting or using a minimum value of a level range regarding a new inductance value "L_new".

In the aforementioned embodiment, a case where L_new and Vrec_limit_new are transmitted and received as the threshold adjustment support information has been described, but the present invention is not limited thereto. For example, the coupling coefficient "k_new" of a new power receiver may be transmitted and received as threshold adjustment support information.

The coupling coefficient "k_new" of the new power receiver may be derived by comparing the shape and/or side of the coil of the new power receiver with the shape and/or side of the coil of a reference power receiver. In this case, the charging distances of the new and reference power receivers may be assumed to the same. If L_new, Vrec_limit_new, and k_new are transmitted to the power transmitter as the threshold adjustment support information, a current threshold may be adjusted based on Equation 4 below.

$$I_{th\_new} = I_{th\_ref} \times \frac{V_{rec\_limit\_new}}{V_{rec\_limit\_ref}} \times \sqrt{\frac{L_{ref}}{L_{new}}} \times \frac{k_{ref}}{k_{new}} \quad (4)$$

In Equation 4, k_ref is a coupling coefficient between a reference power receiver and a power transmitter, and k_new is a coupling coefficient between a new power receiver and the power transmitter.

Coupling coefficient information transmitted as threshold adjustment support information may also be transmitted in a form (e.g., k_new=0.5) explicitly indicative of a specific value or may be transmitted in a form (e.g., 24V≤Vrec_limit_new≤25 V) indicative of a specific level range as below. For example, if coupling coefficient information is transmitted in a form indicative of a specific level range and has a bit size of 3 bits, it may be signaled as below.
"000": 0≤k<0.1
"001": 0.1≤k<0.2
"010": 0.2≤k<0.3
"011": 0.3≤k<0.4
"100": 0.4≤k<0.5
"101": 0.5≤k FIG. 11 is a graph showing the results of the measurement of power and coil current of a power transmitter which are limited in order to satisfy a maximum-receivable rectified voltage with respect to each of different types of a plurality of power receivers. In FIG. 11, TH_ref is a voltage level "I_th_ref" set based on a reference power receiver, and New TH_ref is a new voltage level "I_th_new" set based on a new power receiver.

Referring to FIG. 11, in the case of other power receivers, it may be seen that all of pieces of currents limited based on the input power of a power transmitter are located within the voltage level "TH_ref." Accordingly, there is no great problem in charging performance although the current thresholds of corresponding power receivers are set as TH_ref. However, it may be seen that charging performance is deteriorated because input power of a power transmitter is limited to 2 A with respect to a GP(LP1D) power receiver although a coil current of up to about 2.5 A can flow in an area in which input power is 5 W. Accordingly, charging performance can be improved by applying New TH_ref, that is, a new current threshold, to the GP(LP1D) power receiver.

FIG. 12 is a flowchart illustrating a method for transmitting, by the power transmitter, power according to an embodiment of the present invention. The aforementioned embodiments may be applied to this flowchart identically or similarly, and a redundant description thereof is omitted.

First, the power transmitter may detect the placement of objects on a surface of an interface included in the power transmitter and select a power receiver that belongs to the detected objects and to which power is to be transmitted at step S1210. This step may correspond to the selection phase described with reference to FIG. 3.

Next, the power transmitter may perform digital ping for applying a power signal for detecting and identifying the power receiver to the power receiver, and may receive a response to the digital ping from the power receiver at step S1220. This step may correspond to the ping phase described with reference to FIG. 3.

Next, the power transmitter may obtain information about the configuration of the power receiver and establish a power transfer contract with the power receiver using the configuration information at step S1230. In this case, the configuration information may have included information about a maximum (rectified) power level which may be received by the power receiver. This step may correspond to the identification and configuration phase described with reference to FIG. 3.

Next, the power transmitter may wirelessly send the power to the power receiver based on the established power transfer contract at step S1240.

Although not shown in the flowchart, prior to the transmission of power, the power transmitter may receive threshold adjustment support information used to adjust the reference threshold of a current of the primary coil from the power receiver. In this case, the reference threshold may be set based on a reference power receiver having a maximum-receivable rectified voltage level set as a predetermined level. For example, the rectified voltage level may have been set to 20 V. Furthermore, the threshold adjustment support information may be indicative of the inductance value of the power receiver and/or a maximum rectified voltage level which may be received by the power receiver.

In this case, the power transmitter may adjust the reference threshold based on the received threshold adjustment support information, may determine a power level to be transmitted to the power receiver based on the established power transfer contract and the adjusted reference threshold, and may send power having the determined power level to the power receiver.

Various embodiments have been described in the best form for implementing the embodiments of the present invention.

An embodiment of the present invention may be applied to various wireless charging technologies.

In accordance with an embodiment of the present invention, there is an advantage in that charging efficiency and charging speed are improved because charging power is flexibly allocated to remaining power receivers depending on a reduction of the number of power receivers that are being charged.

In accordance with another embodiment of the present invention, there are advantages in that charging efficiency is improved and a shared mode in which power is simultaneously provided to a plurality of power receivers is supported because power allocated to each power receiver is flexibly controlled depending on an increase in the number of power receivers that are being charged.

In accordance with another embodiment of the present invention, there are advantages in that a power transmitter is stable regardless of the specifications of a power receiver to be charged and a power transmission method having a maximized charging performance/area can be provided because the current threshold properly adjusted according to the specifications of each power receiver is set.

What is claimed is:

1. A method for wirelessly transmitting, by a power transmitter including a primary coil, power, the method comprising:
    detecting a placement of objects on a surface of an interface included in the power transmitter and selecting a power receiver which belongs to the detected objects and to which power is to be transmitted;
    performing digital ping for applying a power signal for detecting and identifying the power receiver to the power receiver and receiving a response to the digital ping from the power receiver;
    obtaining information about a configuration of the power receiver and establishing a power transfer contract with the power receiver using the configuration information;
    receiving threshold adjustment support information used to adjust a reference threshold of a current of the primary coil from the power receiver prior to the transmission of the power; and
    wirelessly transmitting the power to the power receiver based on the established power transfer contract,
    wherein the reference threshold is set based on a reference power receiver having a maximum-receivable rectified voltage level set as a predetermined level,
    wherein the transmitting the power comprises:
        adjusting the reference threshold based on the received threshold adjustment support information; and
        determining a power level to be transmitted to the power receiver based on the established power transfer contract and the adjusted reference threshold and transmitting the power having the determined power level to the power receiver,
    wherein the threshold adjustment support information is indicative of an inductance value of the power receiver and/or the maximum rectified voltage level capable of being received by the power receiver, and
    wherein the adjusting the reference threshold comprises adjusting the reference threshold in inverse proportion to the inductance value and in proportion to the maximum rectified voltage level.

2. The method of claim 1, wherein the predetermined level is 20 V.

3. The method of claim 1, wherein the reference threshold is adjusted based on Equation 1 below, $$I_{th\_new} = I_{th\_ref} \times \frac{V_{rec\_limit\_new}}{V_{rec\_limit\_ref}} \times \sqrt{\frac{L_{ref}}{L_{new}}}$$

wherein the $I_{th\_new}$ is a reference threshold after the adjustment, the $I_{th_{ref}}$ is a reference threshold prior to the adjustment, the $V_{rec\_limit\_new}$ is the maximum rectified voltage level of the power receiver, the $V_{rec\_limit\_ref}$ is the maximum rectified voltage level of the reference power receiver, the $L_{ref}$ is an inductance value of the reference power receiver, and the $L_{new}$ is the inductance value of the power receiver.

4. The method of claim 1, wherein if the threshold adjustment support information is indicative of a first range comprising the inductance value and a second range comprising the maximum rectified voltage level, the adjusting the reference threshold comprises adjusting the reference threshold in inverse proportion to a minimum value of the first range and in proportion to a maximum value of the second range.

5. The method of claim 1, wherein if the threshold adjustment support information is indicative of a first range comprising the inductance value and a second range comprising the maximum rectified voltage level, the adjusting the reference threshold comprises adjusting the reference threshold in inverse proportion to a maximum value of the first range and in proportion to a minimum value of the second range.

6. The method of claim 1, wherein the configuration information comprises information about a maximum power level capable of being received by the power receiver.

7. The method of claim 1, wherein the power transfer contract information comprises limit information about a plurality of parameters which characterizes a transfer of the power to the power receiver.

8. A method for wirelessly receiving, by a power receiver comprising a secondary coil, power, the method comprising:
    performing digital ping in which a power signal for detecting and identifying the power receiver is received from a power transmitter and transmitting a response to the digital ping to the power transmitter;
    transmitting information about a configuration of the power receiver to the power transmitter and establishing a power transfer contract with the power transmitter based on the configuration information;
    wirelessly receiving power from the power transmitter based on the established power transfer contract; and
    transmitting threshold adjustment support information used to adjust a reference threshold of a current of a primary coil included in the power transmitter to the power transmitter prior to the reception of the power,
    wherein the reference threshold is set based on a reference power receiver having a maximum-receivable rectified voltage level set as a predetermined level,
    wherein transmitting of the power by the power transmitter comprises:
        adjusting the reference threshold based on the received threshold adjustment support information; and
        determining a power level to be transmitted to the power receiver based on the established power transfer contract and the adjusted reference threshold and transmitting the power having the determined power level to the power receiver,
    wherein the threshold adjustment support information is indicative of an inductance value of the power receiver and/or the maximum rectified voltage level capable of being received by the power receiver, and
    wherein the adjusting the reference threshold comprises adjusting the reference threshold in inverse proportion to the inductance value and in proportion to the maximum rectified voltage level.

9. A power transmitter, comprising:
at least one primary coil configured to generate a magnetic field; and
a communication & control unit configured to control communication with a power receiver and a transfer of power to the power receiver,
wherein the communication & control unit is configured to:
detect a placement of objects on a surface of an interface provided in the power transmitter and select a power receiver which belongs to the detected objects and to which power is to be transmitted,
perform digital ping for applying a power signal for detecting and identifying the power receiver to the power receiver and receive a response to the digital ping from the power receiver,
obtain information about a configuration of the power receiver and establish a power transfer contract with the power receiver using the configuration information,
receive threshold adjustment support information used to adjust a reference threshold of a current of the primary coil from the power receiver prior to the transmission of the power, and
wirelessly transmit the power to the power receiver based on the established power transfer contract,
wherein the reference threshold is set based on a reference power receiver having a maximum-receivable rectified voltage level set as a predetermined level,
wherein the transmitting the power comprises:
adjusting the reference threshold based on the received threshold adjustment support information; and
determining a power level to be transmitted to the power receiver based on the established power transfer contract and the adjusted reference threshold and transmitting the power having the determined power level to the power receiver,
wherein the threshold adjustment support information is indicative of an inductance value of the power receiver and/or the maximum rectified voltage level capable of being received by the power receiver, and
wherein the adjusting the reference threshold comprises adjusting the reference threshold in inverse proportion to the inductance value and in proportion to the maximum rectified voltage level.

* * * * *